(12) United States Patent
Luo et al.

(10) Patent No.: US 6,880,580 B2
(45) Date of Patent: Apr. 19, 2005

(54) HEAT PIPE HAVING AN ELASTIC SEALING MEMBER

(75) Inventors: Chin-Kuang Luo, 5F, No. 56, Min-Chuan Rd., Chung Dist., Taichung City (TW); Chin-Liang Kuo, Ping-Tung (TW)

(73) Assignee: Chin-Kuang Luo, Taichung (TW)

( * ) Notice: Subject to any disclaimer, the term of this patent is extended or adjusted under 35 U.S.C. 154(b) by 0 days.

(21) Appl. No.: 10/684,298

(22) Filed: Oct. 10, 2003

(65) Prior Publication Data

US 2004/0221905 A1 Nov. 11, 2004

(30) Foreign Application Priority Data

May 5, 2003 (TW) ........................................ 92112238 A

(51) Int. Cl.⁷ ............................................... F16L 55/10
(52) U.S. Cl. ...................... 138/96 R; 138/89; 138/109; 215/247
(58) Field of Search .......................... 138/962, 89, 109; 215/247, 355, 364; 220/801, 804

(56) References Cited

U.S. PATENT DOCUMENTS

| 3,092,278 | A | * | 6/1963 | Bertil | 215/247 |
| 3,424,329 | A | * | 1/1969 | Hershberg et al. | 215/247 |
| 3,578,037 | A | * | 5/1971 | Flynn | 141/2 |
| 3,770,155 | A | * | 11/1973 | Novitch | 215/247 |
| 4,226,333 | A | * | 10/1980 | Percarpio | 215/247 |
| 4,664,274 | A | * | 5/1987 | Konrad | 215/232 |
| 5,514,339 | A | * | 5/1996 | Leopardi et al. | 422/99 |
| 6,308,847 | B1 | * | 10/2001 | Andersson et al. | 215/247 |
| 6,382,441 | B1 | * | 5/2002 | Carano | 215/247 |
| 6,382,442 | B1 | * | 5/2002 | Thibault et al. | 215/249 |
| 6,720,044 | B1 | * | 4/2004 | Andersson et al. | 428/35.7 |

* cited by examiner

Primary Examiner—Patrick Brinson
(74) Attorney, Agent, or Firm—Trop, Pruner & Hu, P.C.

(57) ABSTRACT

A heat pipe includes a hollow body having a receiving space and an open end, a cover member covering the open end, and having a filling hole in fluid communication with the receiving space and extending through an outer side of the cover member, an elastic sealing member fitted within the filling hole, and a heat transfer fluid disposed in the receiving space. The elastic sealing member is pierceable to provide a passage for injection of the heat transfer fluid through the elastic sealing member, and is contractible to seal the passage.

7 Claims, 13 Drawing Sheets

US 6,880,580 B2

HEAT PIPE HAVING AN ELASTIC SEALING MEMBER

CROSS-REFERENCE TO RELATED APPLICATION

This application claims priority of Taiwanese Application No. 092112238, filed on May 5, 2003.

BACKGROUND OF THE INVENTION

1. Field of the Invention

The invention relates to a heat pipe, more particularly to a heat pipe having an elastic sealing member.

2. Description of the Related Art

Referring to FIGS. 1 to 4, a method for producing a conventional heat pipe 10 includes the steps of providing a metallic hollow body 11 with an open end portion 111 and an inner chamber, pouring a suitable amount of heat transfer liquid into the hollow body 11, and evacuating and sealing the hollow body 11. The sealing process of the conventional heat pipe 1 includes the following steps:

(A) pinching the open end portion 111 of the hollow body 11 by means of a machine tool 2 so as to close the open end portion 111 and so as to form a flattened sealing portion 112;

(B) cutting a top end portion 1121 of the flattened sealing portion 112 by means of a cutting machine 3; and (C) sealing the heat pipe 10 by a spot welding process.

However, in actual use, the aforementioned flattened sealing portion 112 of the heat pipe 10 is easily broken due to an external force, thereby resulting in leakage of the heat pipe 10. Furthermore, the flattened sealing portion 112 increases the length of the heat pipe 10 so that the latter has a relatively large volume. Moreover, since the liquid is first poured into the hollow body 11 followed by the evacuation process, it is possible that some of the liquid will be drawn out such that the quantity of the liquid in the hollow body 11 and the quality of the heat pipe 10 cannot be accurately controlled. Additionally, the method for producing the conventional heat pipe 10 is somewhat complicated.

SUMMARY OF THE INVENTION

Therefore, the main object of the present invention is to provide a heat pipe that is capable of overcoming the aforementioned drawbacks of the prior art.

According to this invention, a heat pipe comprises: a hollow body having a receiving space and an open end; a cover member covering the open end, and having an inner side facing the receiving space, an outer side opposite to the inner side, and a filling hole formed in the cover member, in fluid communication with the receiving space, and extending through the outer side; an elastic sealing member fitted within the filling hole; and a heat transfer fluid disposed in the receiving space. The elastic sealing member is pierceable to provide a passage for injection of the heat transfer fluid through the elastic sealing member, and is contractible to seal the passage.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
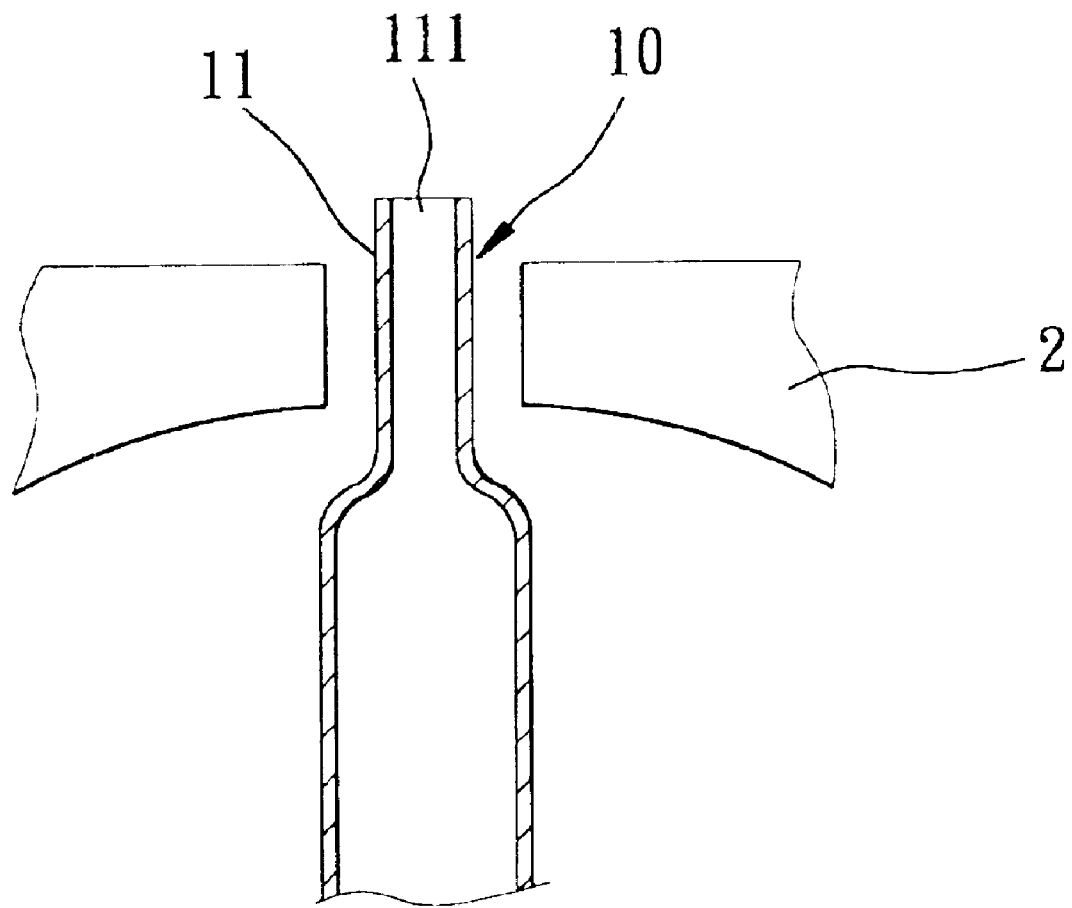
FIG. 1 is a fragmentary sectional view of a conventional heat pipe prior to pinching of an open end portion by a machine tool.
Figure 2:
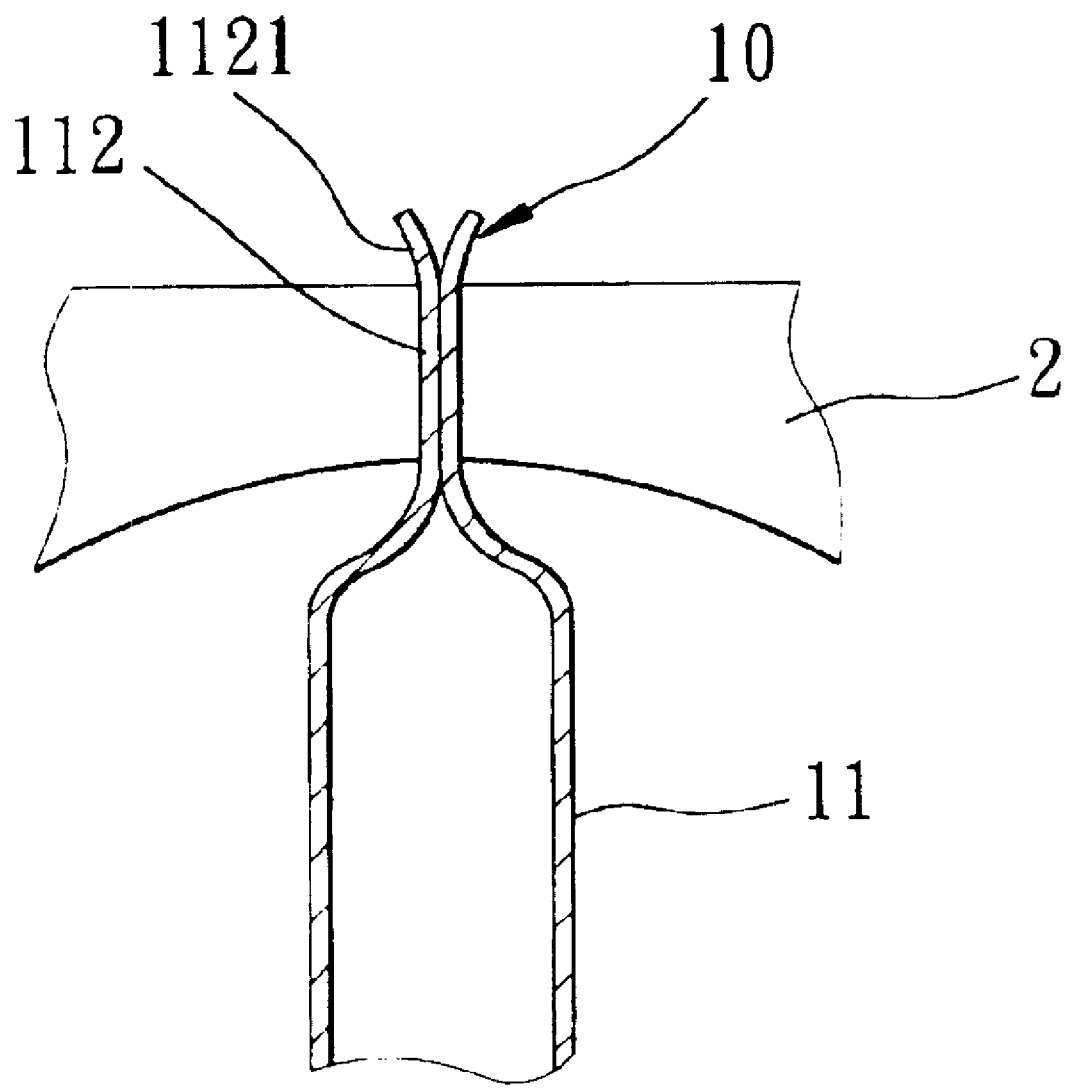
FIG. 2 is another fragmentary sectional view of the conventional heat pipe, illustrating the pinching of the open end portion of the heat pipe by the machine tool to form a flattened sealing portion.
Figure 3:
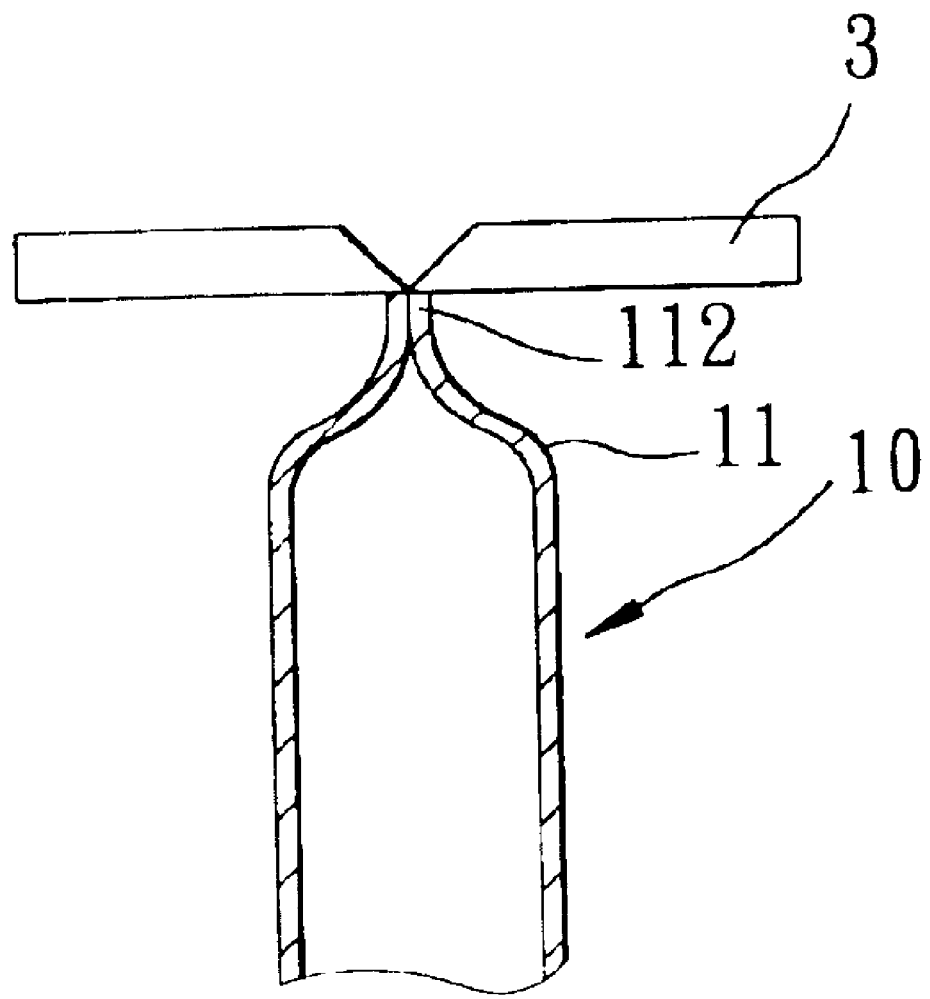
FIG. 3 is yet another fragmentary sectional view of the conventional heat pipe, illustrating a top end portion of the flattened sealing portion which has been cut by a cutting machine.
Figure 4:
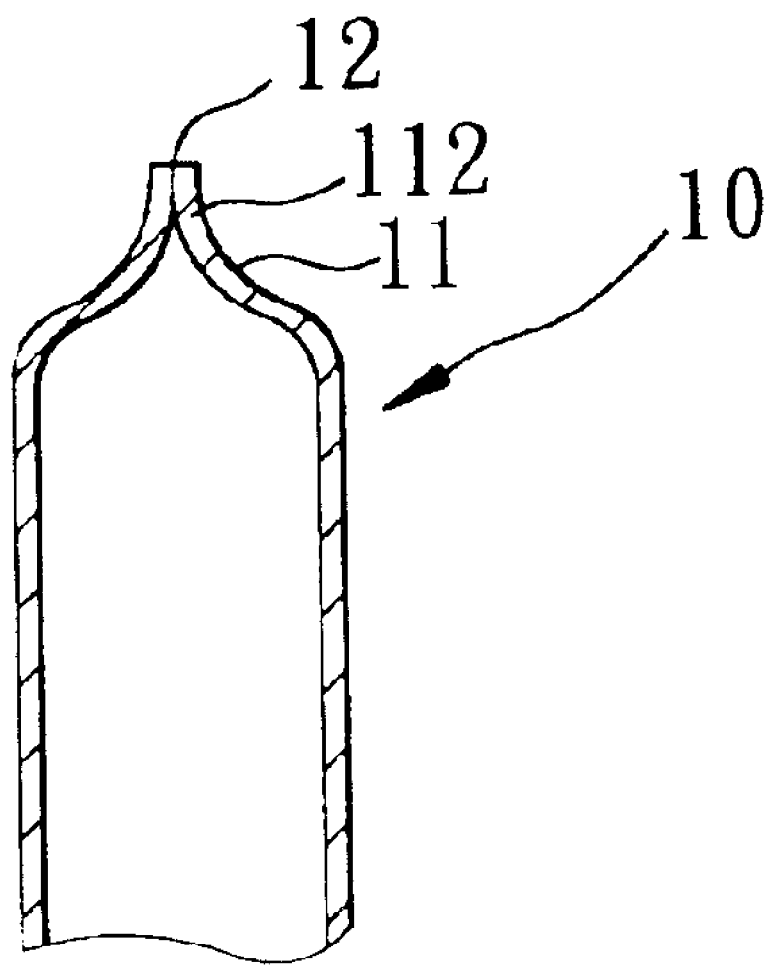
FIG. 4 is a further fragmentary sectional view of the conventional heat pipe, illustrating that the heat pipe has been sealed by a spot welding process.
Figure 5:
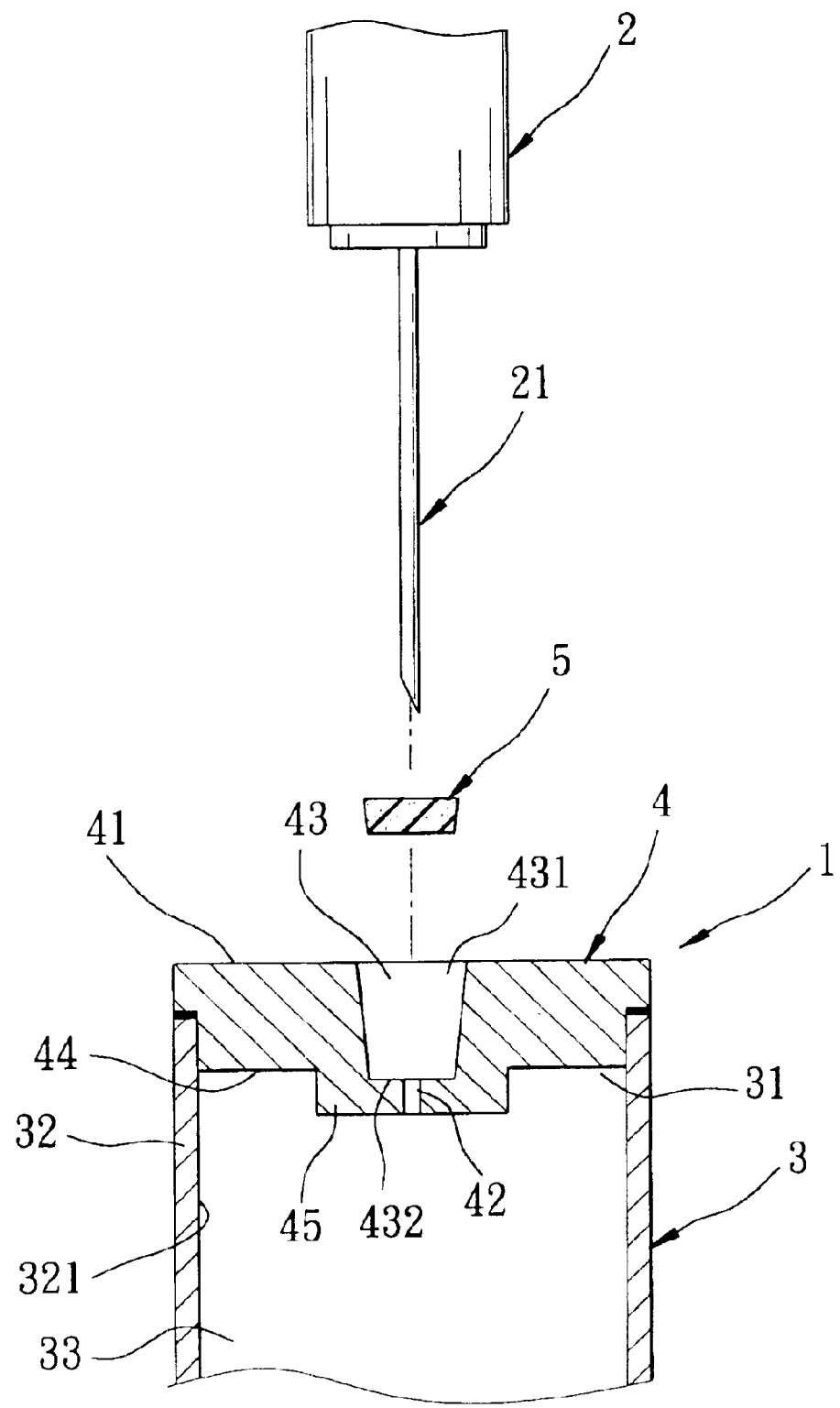
FIG. 5 is a partly exploded fragmentary sectional view of the first preferred embodiment of a heat pipe according to the present invention.
Figure 6:
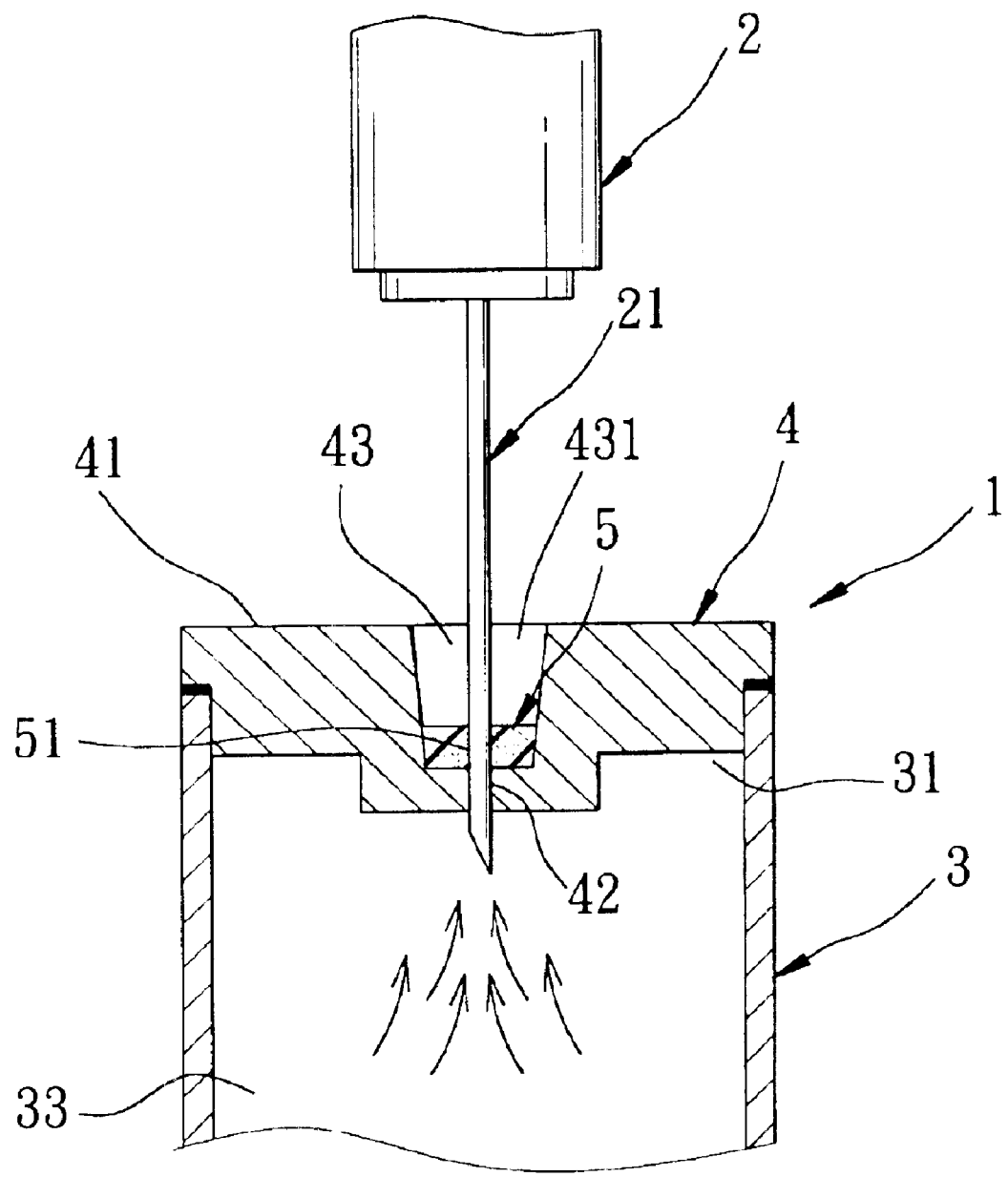
FIG. 6 is a fragmentary sectional view to illustrate how a needle that is connected to a controlling unit draws out air from within a hollow body of the heat pipe of the first preferred embodiment.

Before the present invention is described in greater detail, it should be noted that like elements are denoted by the same reference numerals throughout the disclosure.

Figure 7:
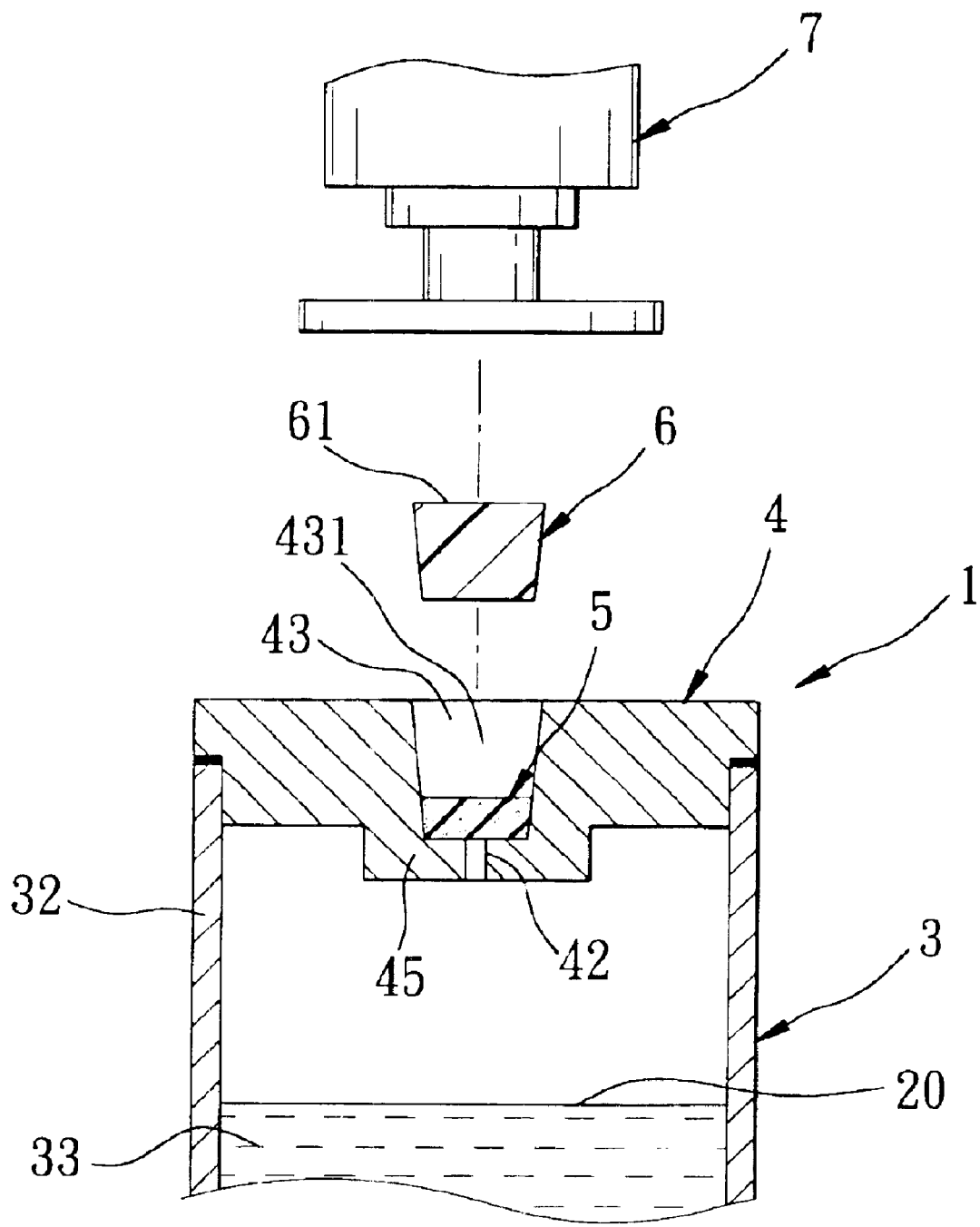
FIG. 7 is a fragmentary sectional view of the first preferred embodiment, illustrating how a securing member can be fitted into a blind hole in a cover member.
Figure 8:
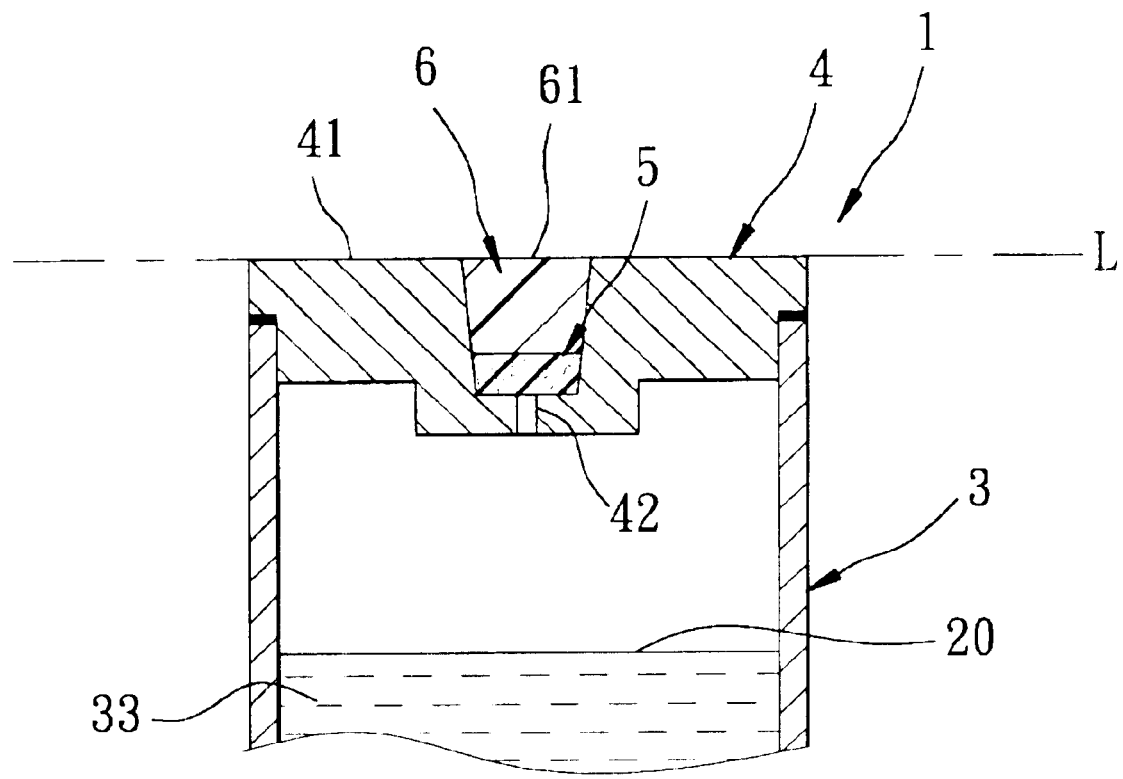
FIG. 8 is a fragmentary sectional view to illustrate the hollow body of the heat pipe of the first preferred embodiment when sealed.

Referring to FIGS. 5 to 8, the first preferred embodiment of a heat pipe 1 according to the present invention is shown to comprise a metal hollow body 3, a metal cover member 4, an elastic sealing member 5, a securing member 6 (see FIG. 7), and a heat transfer fluid 20 (see FIG. 7).

The metal hollow body 3 has an open end 31, and a peripheral wall 32 with an inner surface 321 defining a receiving space 33.

The cover member 4 covers sealingly the open end 31 of the hollow body 3. In this embodiment, the cover member 4 is welded on the open end 31 of the hollow body 31. However, the cover member 4 can be threadedly engaged to the peripheral wall 32 of the hollow body 3, or press fitted into the peripheral wall 32 by a machine tool (not shown). The cover member 4 has an outer side 41, an inner side 44 opposite to the outer side 41 and facing the receiving space 33, and a filling hole 43 formed in the cover member 4, in fluid communication with the receiving space 33, and extending through the outer side 41. The filling hole 43 is formed as a blind hole 431 which opens at the outer side 41 and which has a closed end 432 adjacent to the inner side 44.

The cover member 4 further has a seat part 45 at the inner side 44 to bound the closed end 432. The seat part 45 has a first needle hole 42 extending through the inner side 44 and communicated with the blind hole 431. The blind hole 431 has a cross-section, which is gradually reduced from the outer side 41 to the inner side 44.

In this embodiment, the elastic sealing member 5 is a cured sealing block fitted within the filling hole 43, and is made of an elastic material, such as a rubber or a silicone elastomer.

The securing member 6 (see FIG. 7) is disposed fittingly in the blind hole 431 and outwardly of the sealing member 5 so as to press the sealing member 5 against the seat part 45.

The heat transfer fluid 20 (see FIG. 8) is disposed in the receiving space 33 in the hollow body 3.

The elastic sealing member 5 is pierceable to provide a passage 51 (see FIG. 6) for injection of the heat transfer fluid 20 through the elastic sealing member 5, and is contractible to seal the passage 51.

Referring once again to FIGS. 6 and 8, to fill the hollow body 3 with the heat transfer fluid 20, the needle 21 is extended into the receiving space 33 in the hollow body 3 by passing through the blind hole 43, the sealing member 5, and the first needle hole 42 in the seat part 45 of the cover member 4. The needle 21 is connected to a controlling unit 2, which operates to subsequently evacuate air from within the receiving space 33 and to introduce a predetermined amount of the heat transfer fluid 20 into the receiving space 33. When the needle 21 is withdrawn from the hollow body 3, the sealing member 5, because of its elasticity, contracts to seal the passage 51. Afterwards, the securing member 6 is fitted sealingly into the blind hole 431 by means of a tool 7 so as to press the sealing member 5 against the seat part 45, thereby sealing the first needle hole 42 and preventing air from entering the receiving space 33 in the hollow body 3. At this time, the outer surface 61 of the securing member 6 is flush with the outer side 41 of the cover member 4, as shown by the straight line (L) in FIG. 8.

Unlike the aforementioned conventional heat pipe 10, the heat pipe 1 of the present invention does not have to undergo the processes of pinching and cutting prior to sealing. Furthermore, the heat pipe 1 of the present invention has an outer appearance that is not easily broken by an external force, and a length that is shorter than that of the conventional heat pipe 10 so that it does not occupy a relatively large space. Moreover, the amount of the heat transfer fluid 20 filled in the hollow body 3 can be controlled accurately using simple processing equipment so that working quality of the heat pipe 1 of the present invention can be effectively ensured.

Figure 9:
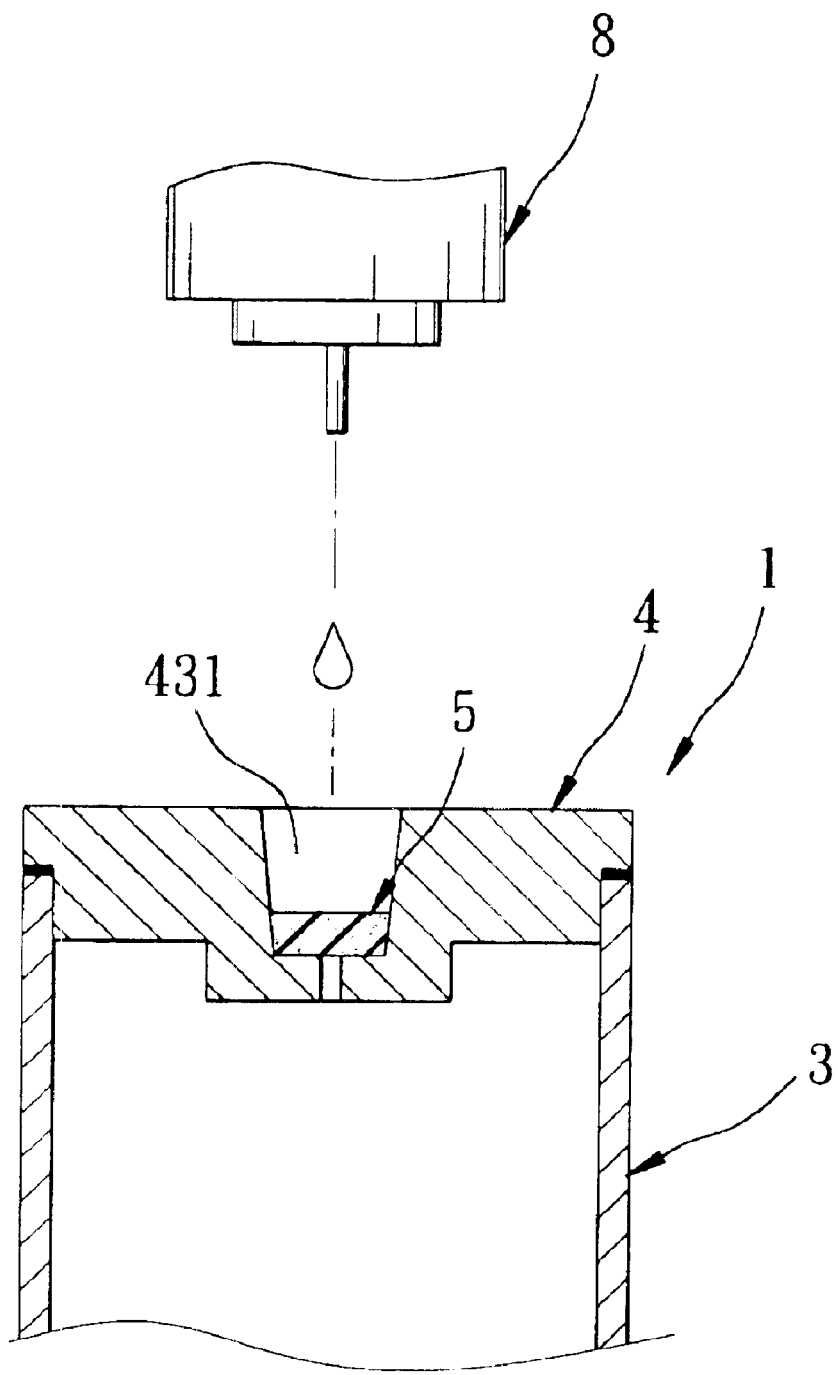
FIG. 9 is a fragmentary sectional view of the second preferred embodiment of the heat pipe according to the present invention.
Figure 10:
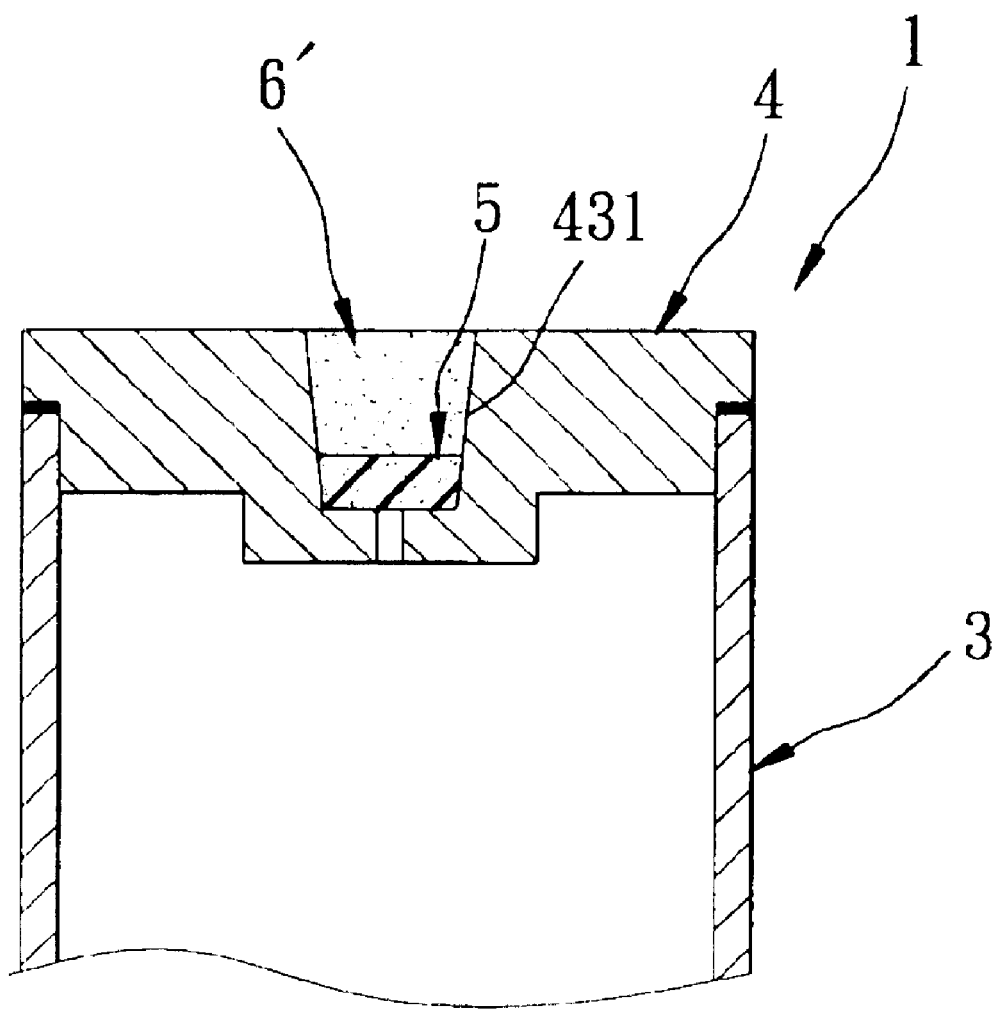
FIG. 10 is a fragmentary sectional view of the heat pipe of the second preferred embodiment when sealed.

Referring to FIGS. 9 and 10, the second preferred embodiment of the heat pipe 1 according to the present invention is shown to be substantially similar to the first preferred embodiment. However, in this embodiment, the securing member 6' is provided by introducing a curable resin into the blind hole 431 through a sealing machine 8. After the resin is cured, the resulting securing member 6' is retained sealingly in the blind hole 431, and abuts sealingly against the sealing member 5.

Figure 11:
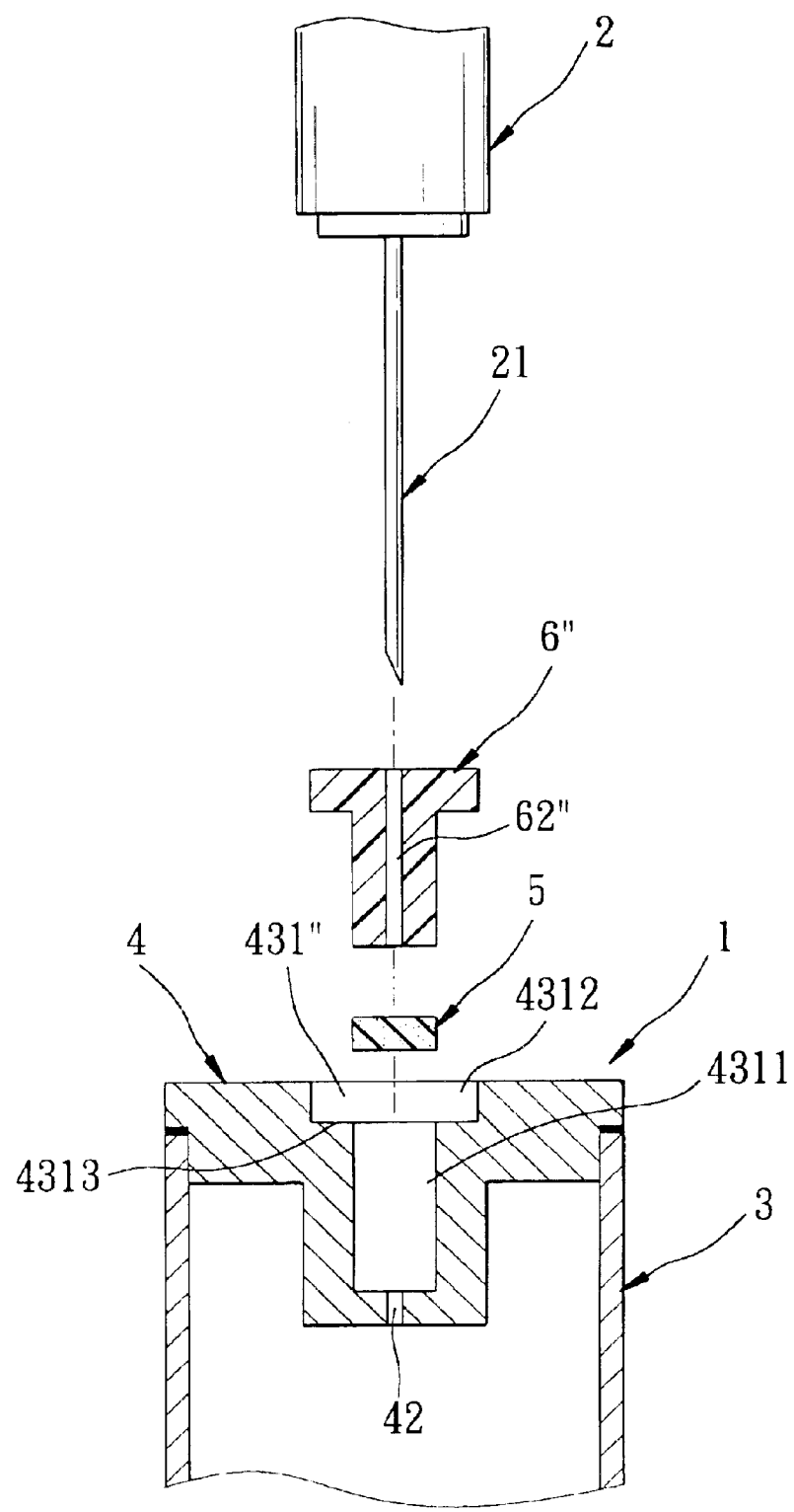
FIG. 11 is a partly exploded fragmentary sectional view of the third preferred embodiment of the heat pipe according to the present invention.
Figure 12:
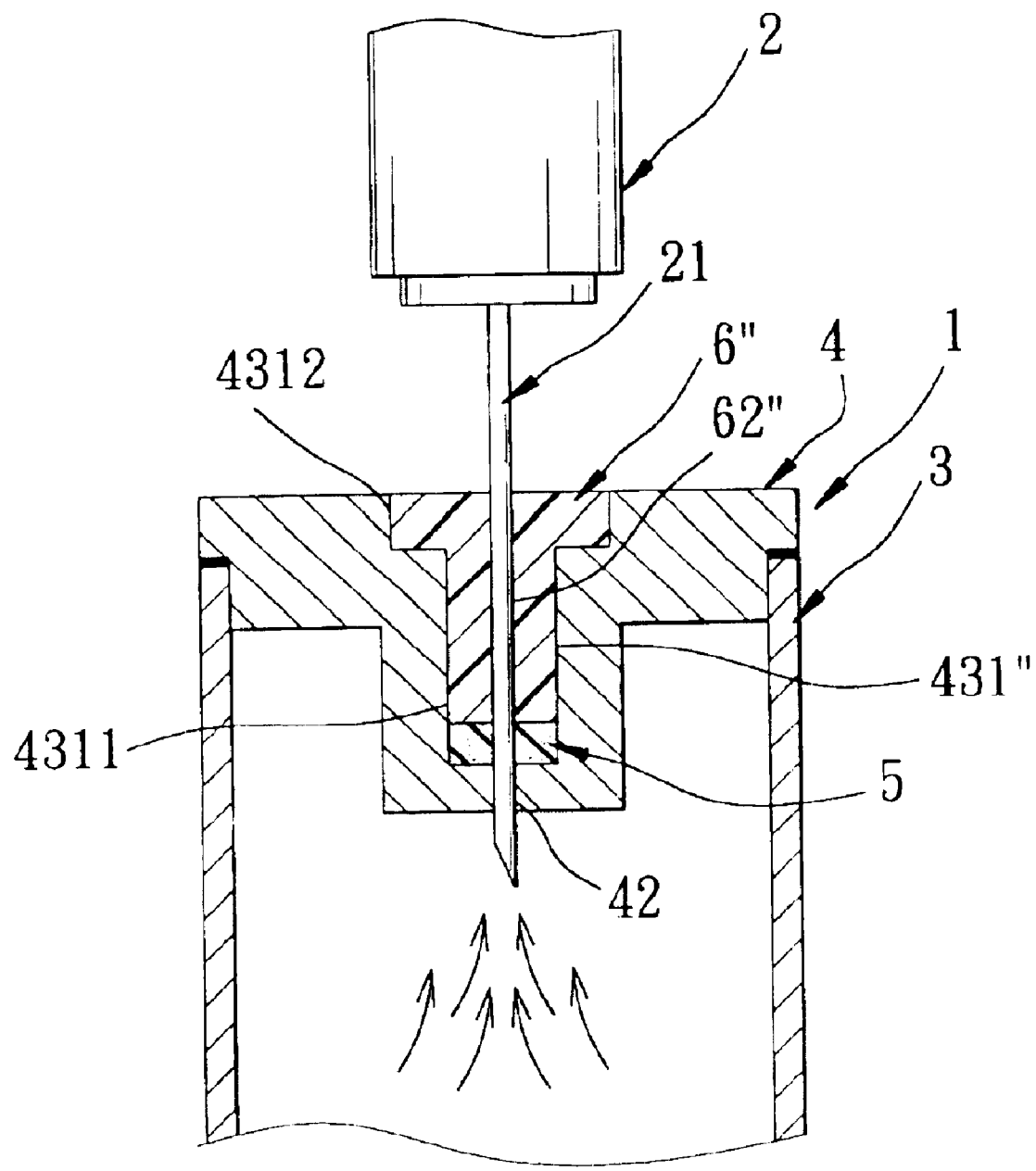
FIG. 12 is a fragmentary sectional view of the third preferred embodiment to illustrate a needle inserted into a hollow body of the heat pipe.
Figure 13:
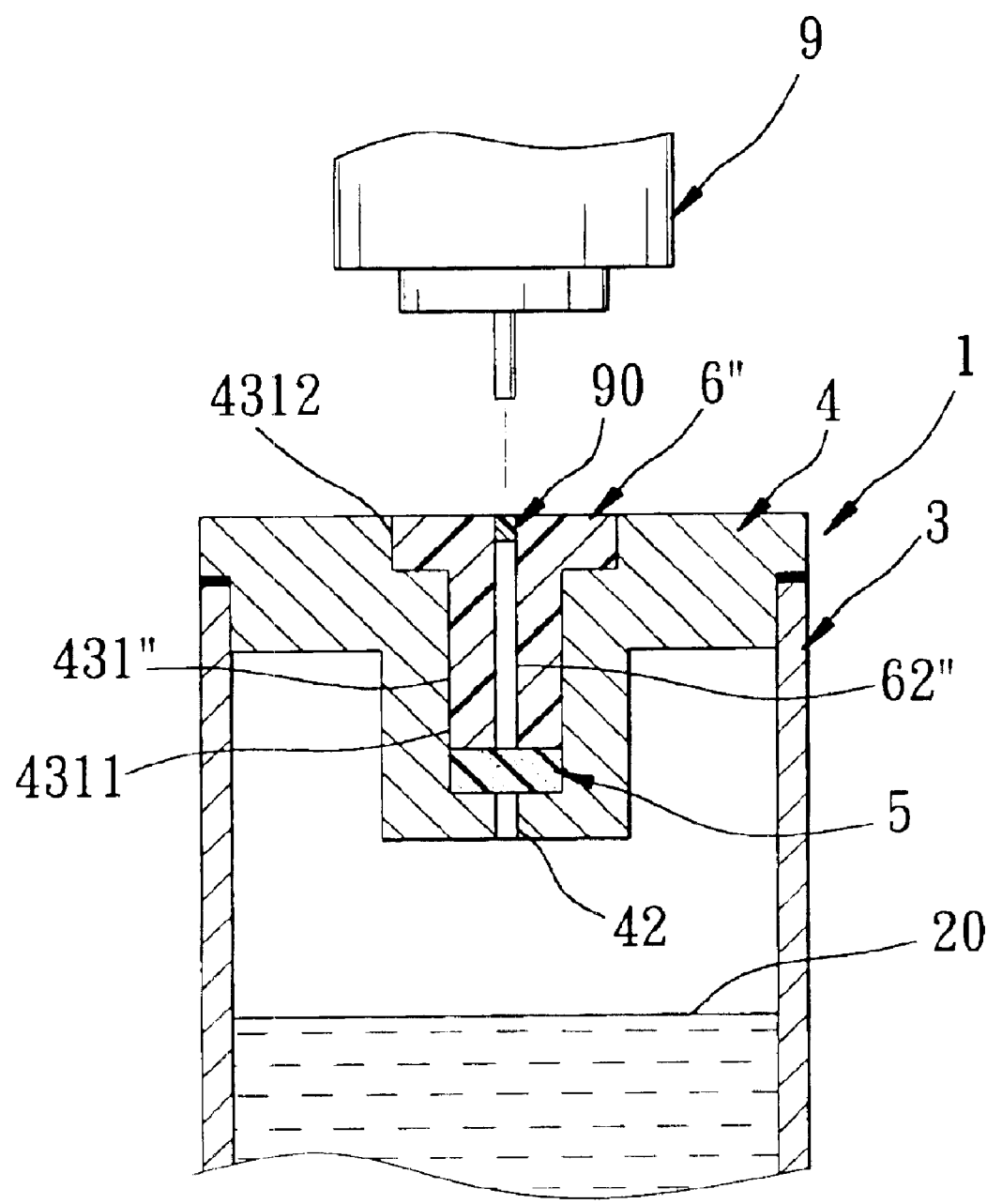
FIG. 13 is a fragmentary sectional view of the heat pipe of the third preferred embodiment when sealed.

Referring to FIGS. 11, 12 and 13, the third preferred embodiment of the heat pipe 1 according to the present invention is shown to be substantially similar to the first preferred embodiment. Unlike the first preferred embodiment, the blind hole 431" in the cover member 4 is formed with a T-shaped cross-section, and includes an inner part 4311, an outer part 4312 having a cross-section greater than that of the inner part 4311, and a shoulder 4313 formed between the inner and outer parts 4311, 4312. The securing member 6" has a shape in conformity with that of the blind hole 431". The securing member 6" further has a second needle hole 62" in alignment with the first needle hole 42 in the cover member 4, and an insert piece 90 (see FIG. 13) disposed sealingly in the second needle hole 62". When the needle 21 is withdrawn from the hollow body 3 and the second needle hole 62" in the securing member 6", the second needle hole 62" is closed by the insert piece 90 for enhanced airtight sealing. The insert piece 90 may be a welding spot formed by a spot welding machine 9, or a sealant.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

We claim:

1. A heat pipe comprising:
   a hollow body having a receiving space and an open end;
   a cover member covering said open end, said cover member having an inner side facing said receiving space, an outer side opposite to said inner side, and a filling hole formed in said cover member, in fluid communication with said receiving space, and extending through said outer side;
   an elastic sealing member fitted within said filling hole; and
   a heat transfer fluid disposed in said receiving space, wherein said elastic sealing member is pierceable to provide a passage for injection of said heat transfer fluid through said elastic sealing member, and is contractable to seal said passage, wherein said filling hole includes a hole which opens at said outer side, said cover member further having a seat part bounding said hole at said inner side, said filling hole further having a first needle hole extending through said seat part and communicated with said hole and said receiving space, said heat pipe further comprising a securing member disposed fittingly in said hole and outwardly of said sealing member so as to press said sealing member against said seat part.

2. The heat pipe as claimed in claim 1, wherein said securing member is flush with said outer side of said cover member.

3. The heat pipe as claimed in claim 1, wherein said hole has a cross-section which is gradually reduced from said outer side to said inner side.

4. The heat pipe as claimed in claim 1, wherein said hole includes an inner part, an outer part having a cross-section greater than that of said inner part, and a shoulder formed between said inner and outer parts.

5. The heat pipe as claimed in claim 4, wherein said securing member has a shape in conformity with that of said hole.

6. The heat pipe as claimed in claim 1, wherein said securing member further has a second needle hole in alignment with said first needle hole.

7. The heat pipe as claimed in claim 6, wherein said securing member further includes an insert piece disposed sealingly in said second needle hole.

* * * * *